July 23, 1929. H. L. SHOTWELL 1,721,642
INDICATING SIGNAL FOR VEHICLES
Filed Sept. 28, 1928 2 Sheets-Sheet 1
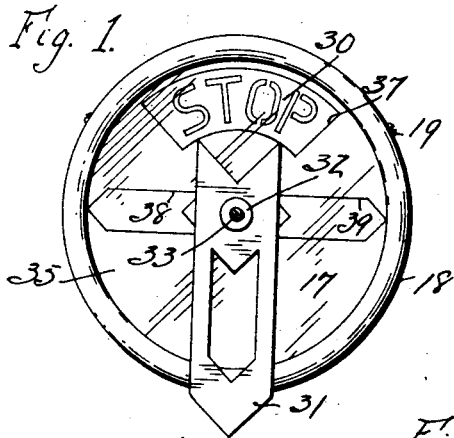
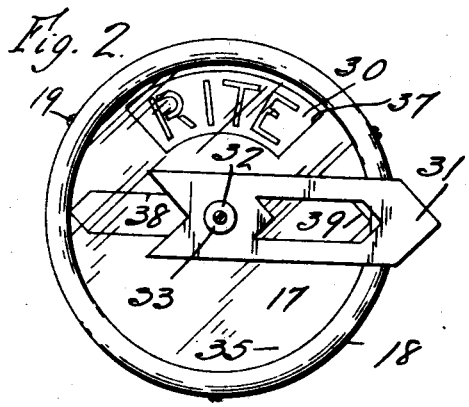
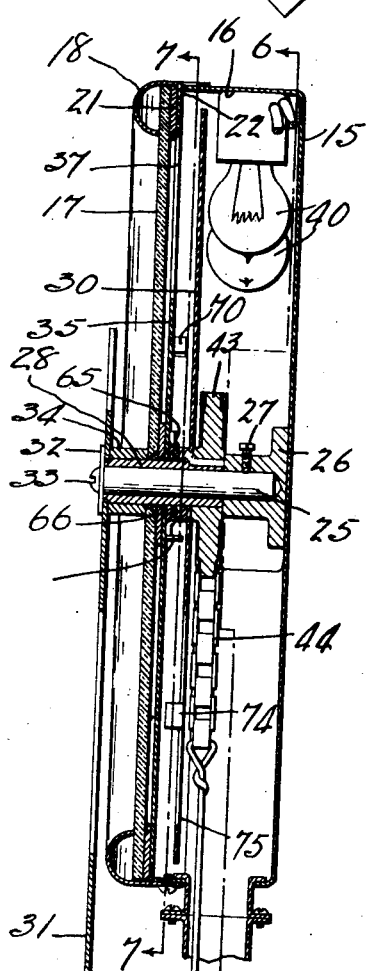
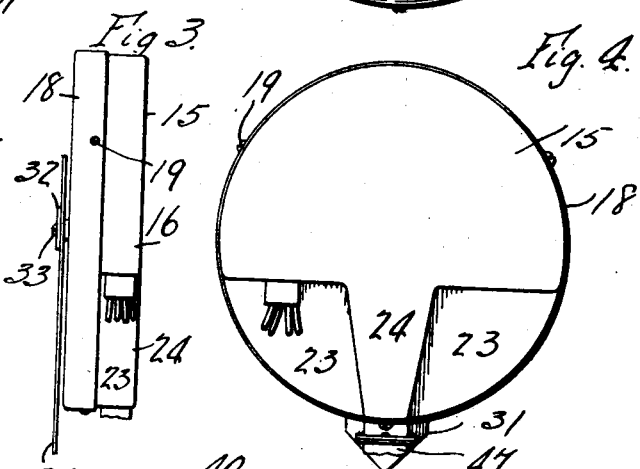
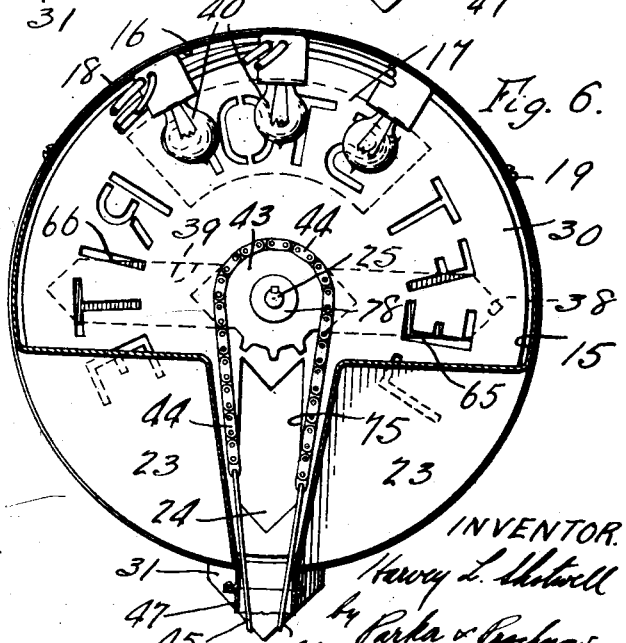
INVENTOR.
Harvey L. Shotwell
by Parker & Perchnow
ATTORNEYS.

July 23, 1929.  H. L. SHOTWELL  1,721,642
INDICATING SIGNAL FOR VEHICLES
Filed Sept. 28, 1928    2 Sheets-Sheet 2
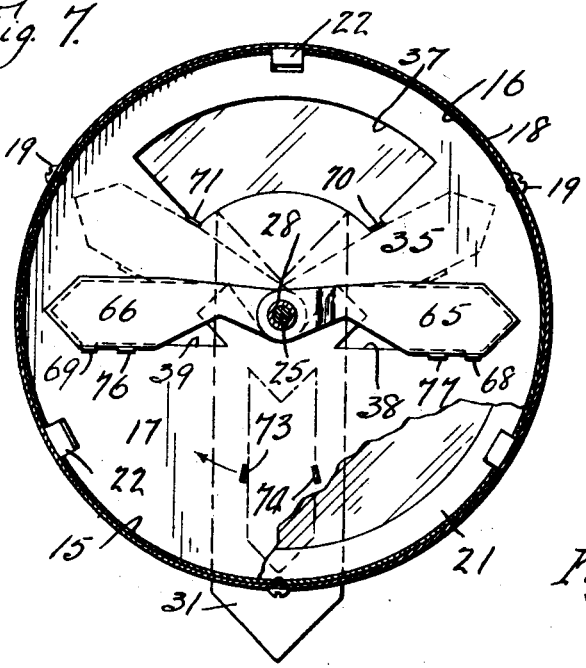
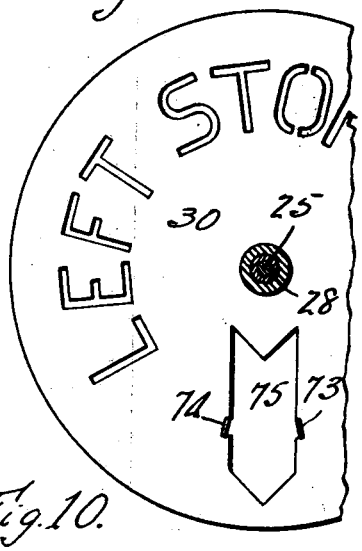
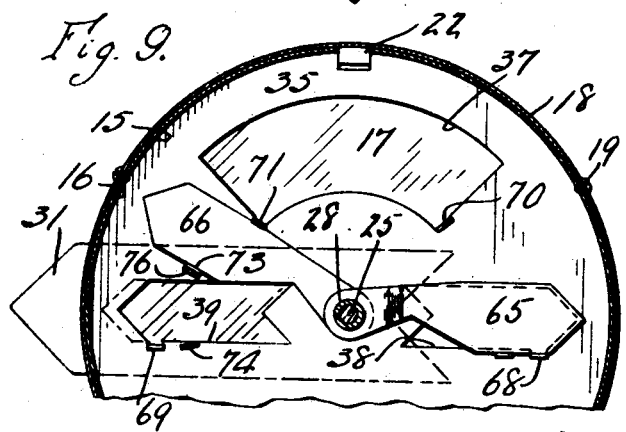
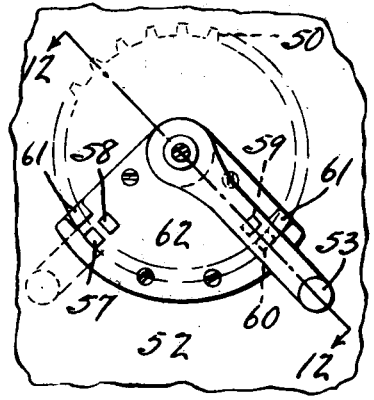
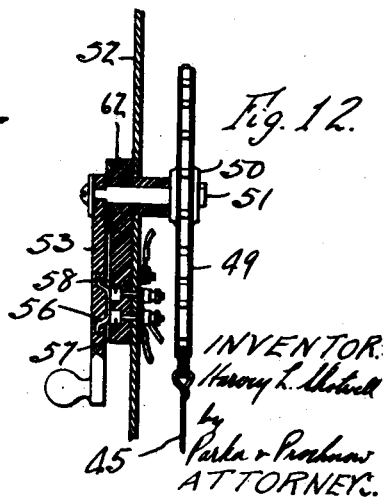
INVENTOR.
Harry L. Shotwell
by
Parker & Proshaw
ATTORNEYS.

Patented July 23, 1929.

1,721,642

UNITED STATES PATENT OFFICE.

HARVEY L. SHOTWELL, OF BUFFALO, NEW YORK.

INDICATING SIGNAL FOR VEHICLES.

Application filed September 28, 1928. Serial No. 308,992.

This invention relates to signal devices for use on vehicles for the purpose of advising adjacent vehicles of the intention of a driver to stop, or to turn either right or left.

The objects of this invention are to provide a signal device of this kind of improved and simplified construction by means of which a clearly visible signal is given, so that drivers of other vehicles can be warned as to what the driver of the vehicle on which the device is mounted proposes to do; also to provide devices of this kind in which a plurality of signals is simultaneously displayed; also to provide a signal device of this kind which is operated from a point adjacent to the driver's seat, and in which the connections between the operating part of the signal and signal itself are positive in their action; also to improve the construction of signal devices of this kind in other respects hereinafter specified:

Figs. 1 and 2 are face views of the signal device, showing the parts thereof in different positions;

Fig. 3 is an edge view thereof;

Fig. 4 is a rear view thereof;

Fig. 5 is a central sectional elevation thereof on an enlarged scale;

Fig. 6 is a sectional view thereof on line 6—6, Fig. 5 on a reduced scale;

Fig. 7 is a sectional view thereof on line 7—7, Fig. 5;

Fig. 8 is a fragmentary face view of the adjustable plate or disc of the signal device;

Fig. 9 is a fragmentary sectional view similar to Fig. 7 but showing the parts in different positions;

Fig. 10 is a face view of the manipulating handle or switch by means of which the signal device may be actuated;

Fig. 11 is a diagrammatic view showing the connection between the operating handle and the signal device;

Fig. 12 is a central sectional elevation of the combined handle and switch on line 12—12 of Fig. 10.

The signal device shown in the accompanying drawing may be arranged in a housing of any suitable or desired contsruction, that shown including a concave or dished rear part 15 having sidewalls 16 extending toward the face of the device, the rear part 15 of the housing being preferably closed by a glass plate 17 which is held in place by means of a circular frame 18 which may be made of sheet metal and secured to the rear portion 15 of the housing by means of screws 19 or the like. In order to keep the glass or transparent plate 17 from rattling, a washer or gasket 21 of paper or other flexible material may be provided on the rear face of the glass which is held in place by means of lugs 22 which are formed integral with the frame 18 which holds the glass in place. The back wall of the housing 15 may have forwardly projecting parts 23 of less depth than the main housing, and a passage 24 between these parts of less depth, but if desired a housing of uniform depth may be used. A housing of any other construction and other means for securing the glass plate thereto may be provided if desired.

The housing 15 has a pivot rod or shaft 25 centrally arranged therein and secured thereto, that shown being secured to a socket 26 which is secured to the housing 15, the pivot being held against turning in the socket by means of a set screw 27. The pivot rod or shaft 25 may also, if desired, extend through a hole in the glass plate 17 and has a sleeve 28 pivoted thereon. This sleeve supports the movable parts of the signal device, which, in the particular construction shown, include a disc or plate 30 arranged within the housing, and a pointer 31 may also be mounted on the portion of this sleeve which extends beyond the glass plate, as in the construction shown.

The sleeve is preferably held in place on the pivot rod or shaft 25 by means of a washer 32 held in place by means of a screw 33 in the head of the pivot rod or shaft 25. When a pointer 31 is used, as in the construction shown, this pointer is preferably spaced from the glass plate 27 by means of a sleeve or collar 34. Other means for supporting a pivoted or oscillatory member for actuating the movable parts of the device may be employed if desired.

The movable disc or plate 30 preferably co operates with a fixed disc or plate 35 arranged adjacent to the inner face of the glass plate 17, and in the particular construction shown, this fixed plate 35 has an arc-shaped aperture 37 and a pair of arrow-shaped apertures 38 and 39 pointing in opposite directions from approximately the center of the indicator. This fixed plate 35 may be secured in place in any suitable or desired manner, and in the construction shown, the outer edge of the flange 16 of the housing 15 abuts against the outer edge of the fixed plate 35 and presses the same against the flexible washer or gasket 21. The movable plate or disc 30, which is mounted on the rotary sleeve 28, is preferably perforated as indicated, to form various signals or signs, such as the words "Stop", "Left" and "Rite", these signals being so formed that they can be placed in registration with the arc-shaped slot 37 so that only one of these signals is visible at a time. The housing 15 is provided with a suitable electric light or the like 40 for illuminating the signals.

The movable plate 30 may be turned into different positions in any suitable or desired manner. In the construction shown, the sleeve 28 on which this plate is mounted has a sprocket gear 43 suitably secured thereto, and a sprocket chain 44 engages with the teeth of this wheel. The ends of the sprocket chain are suitably secured to a pair of wires 45 and 46 which lead to an actuating device for the signal, arranged in a position convenient to the driver.

In the construction shown the two wires pass through conduits 47, see Fig. 11, guide pulleys 48 being provided, if desired, and at their opposite ends the wires are connected to another sprocket chain 49 extending around a sprocket wheel 50 mounted on a shaft 51 which may, for example, be suitably journaled in the dash 52 of the vehicle. A handle 53, preferably made of insulating material is secured to the shaft 51 for turning the sprocket wheel 50. It will be understood that any means for connecting the operating handle 53 with the movable or oscillatory member 30 by means of a pair of tension members or wires may be provided, the means shown merely being one embodiment of this invention.

In order to facilitate the actuation of the signal device the sprocket wheel 50 is preferably made of twice the diameter of the sprocket wheel 43 so that a certain movement of the handle 53 produces twice the movement of the signal device. The parts described are preferably so arranged that when the handle 53 is in a substantially vertical position, the pivoted plate 30 is in a position in which the word "Stop" will be in registration with the arc-shaped slot 37 of the fixed plate 35. When the handle 53 is turned to the right, the word "Rite" will appear in back of the arc-shaped slot 37, and when the handle is turned to the left, the word "Left" will appear in the slot. Any other connection between the actuation device and the movable parts of the signal device may be employed in place of this described.

If desired, the handle 53 may also be caused to actuate the lights 40. In the particular construction illustrated, this is done by providing a strip 56 of conducting material on the handle 53, which strip will form a connection between two contacts 57 and 58 when the handle is turned in one direction and will connect two contacts 59 and 60 when the handle is moved to the limit of its movement in the other direction, stops 61 being provided on the panel 62 to limit the movement of the handle about the axis of the shaft 51.

The contacts 57, 58, 59 and 60 may be connected by wires or conductors with the light bulb 40. When the switch or actuating handle is in vertical or neutral position, the word "Stop" will be in registration with the slot 37 and the light 40 may then be actuated through the usual stop light contacts, not shown, which are commonly connected with the braking mechanism of an automobile.

Other means for completing an electric circuit through the lights 40 when the signal device is actuated to indicate either a right or a left turn may be provided, if desired.

By means of the construction described, the pointer 31 which is arranged on the exterior of the signal device, normally occupies an up and down position indicated in Fig. 1, when the handle 53 is in its up and down position. When the handle is turned, for example, to indicate a right turn, the pointer 31 will turn to the right and at the same time the word "Rite" will be displayed in the slot and light 40 will be illuminated to make the signal readable. In a similar manner a left turn is indicated.

In the dark the pointer 31 will not be visible and it is therefore desirable to pass light through one or the other of the arrow-shaped openings 38, 39 to indicate the direction in which a turn is to be made. In the construction illustrated for this purpose, a pair of shutters, 65 and 66 are employed, which normally close the arrow-shaped openings 38 and 39, in the fixed plate 35. These shutters, in the construction shown, are pivoted on the rotatable sleeve 28 to turn freely relatively to this sleeve, and when in their lower positions in which they close those portions of the openings 38 and 39 which are not closed by the movable plate or disc 30, they rest on stop shoulders 68 and 69, which are preferably formed integral with the fixed plate 35, the metal forming the stop shoulders being a part of that removed to form the openings 38 and 39.

When in their upper positions, the shutters engage stop shoulders 70 and 71 adjacent to the arc-shaped opening 37, the shoulders 70 and 71 preferably being also formed integral with the fixed plate 35 and being made of metal removed to form the arc-shaped opening 37.

The shutters 65 and 66 may be moved out of registration with the openings 38 and 39 when it is desired to indicate a turn either to the right or left in any suitable or desired manner. In the particular construction shown for this purpose, the oscillatory plate or disc 30 is provided with shoulders or lugs 73 and 74, which are preferably formed integral with this plate and are formed from the metal removed from this plate to form an opening 75 which is also preferably in the form of an arrow and which may register with either of the openings 38 or 39. These lugs 73 and 74 engage with lugs 76 and 77 formed on the lower edges of the shutters 66 and 65 respectively, when the disc 30 is swung in one direction or another from its "stop" position.

In the operation of the shutters, when the movable plate or disc 30 is turned, for example, to place the word "Rite" into registration with the arc-shaped opening 37, the arrow shaped opening 75 in the movable plate will at the same time move into registration with the opening 39 in the fixed plate 35. Before the movable plate moves into "Rite" position, the projection 73 on the movable plate engages with the lug 76 on the lower edge of the shutter member 66 and raises the shutter into the position shown in Fig. 9 so as to uncover the opening 39 in the fixed plate. When the movable plate is returned to its normal position in which the word "Stop" appears in registration with the arc-shaped opening 37, the shutter 66 is allowed to drop by gravity into its closing position.

I claim:

1. A signal device for vehicles, including a stationary dial having an aperture, a pivoted dial arranged in rear of said stationary dial and having signals movable into registration with said aperture, said movable member being mounted on an axis extending through and in front of stationary dial, means for causing light to pass through said signals and aperture, means for moving said pivoted dial into different relations to said stationary dial, and a pointer arranged in front of said stationary dial and means for moving said pointer into different positions corresponding with positions of said pivoted dial to act as a signal supplementary to that shown by the pivoted dial.

2. A signal device for a vehicle, including a stationary member having an aperture for the display therethrough of a signal word and having additional apertures shaped to indicate opposite directions, a movable member having signal words thereon and which is movable to place one or another of said words into registration with said aperture, shutters normally closing said direction indicating apertures, and means actuated by the movement of said movable member when the latter is moved to display a word through said first aperture to move one or another of said shutters into position to uncover its aperture to indicate a direction appropriate to the word displayed.

3. A signal device for a vehicle, including a stationary member having an aperture for a signal and having additional apertures shaped to indicate other signals, a movable member having signals thereon and which is movable to place one or the other of its signals into and out of registration with said first mentioned aperture, shutters which are pivoted to swing into positons to close said second mentioned apertures, and parts on said movable member adapted to engage one or another of said shutters, depending upon the direction of movement of said movable member, to move a shutter out of its closing position to display of one of said other signals.

4. A signal device for a vehicle, including a stationary member having an aperture for a signal and having additional apertures shaped to indicate other signals, a movable member having signals thereon and which is movable to place one or the other of its signals into and out of registration with said first mentioned aperture, shutters which are pivoted to swing into positions to close said second mentioned apertures, stops for holding said shutters in their closed positions and projections on said movable member engageable with one or the other of said shutters to move the same into open positions to uncover and display one of said signal shaped apertures coincident with the display of a signal on said movable member through said first aperture.

5. A signal device for a vehicle, including a stationary member having an aperture for a signal and having additional apertures by which other supplementary signals may be displayed, a pivoted member having a plurality of signals thereon and which is movable to place one or another of said signals into registration with said first mentioned aperture, shutters normally closing said second mentioned apertures, and parts on said pivoted member for engaging said shutters to move the same into an open position, one of said parts engaging a shutter when said pivoted member is moved in one direction and the other part engaging a shutter when the pivoted member is moved in the other direction, whereby a signal on said movable member when moved opposite said first aperture is displayed therethrough in synchronism with the supplementary signals displayed by said other apertures.

6. A direction indicating signal device for a vehicle, including a stationary member having an aperture through which a signal may be displayed and having additional apertures through which other signals may be displayed, a movable member having a plurality of signals thereon and which is movable to place said one or the other of its signals into registration with said first mentioned aperture, shutters normally closing said second mentioned apertures, means actuated by the movement of said movable member to move one or another of said shutters into position to uncover its aperture, a pointer arranged in front of said stationary member and movable with said movable member in accordance with the direction indicated by the signal in registration with said first mentioned aperture to supplement said signal.

7. A direction indicating signal device for a vehicle, including a stationary member having an aperture through which a signal may be displayed and having additional apertures through which other signals may be displayed, a movable member having a plurality of signals thereon and which is movable to place said one or the other of its signals into registration with said first mentioned aperture, shutters normally closing said second mentioned apertures, means actuated by the movement of said movable member to move one or another of said shutters into position to uncover its aperture, a pointer arranged in front of said stationary member and movable with said movable member in accordance with the direction indicated by the signal in registration with said first mentioned aperture, said pointer being movable in front of said second apertures and having an opening therein through which said direction indicating apertures are visible, whereby said pointer is visible with the appropriate direction aperture and acts as a supplementary indicator thereto.

8. A signal device for vehicles, including a stationary dial having an aperture, a pivoted dial arranged in rear of said stationary dial and having signals movable into registration with said aperture, said movable member being mounted on an axis extending through and in front of stationary dial, means for causing light to pass through said signals and aperture, means for moving said pivoted dial into different relations to said stationary dial, and a pointer arranged in front of said stationary dial and means for moving said pointer into different positions corresponding with positions of said pivoted dial to act as a signal supplementary to that shown by the pivoted dial, and said pointer having an aperture through which said light passes when said pointer is moved to a direction indicating position.

9. A signal device for a vehicle, including a stationary member having an aperture for a signal and having additional apertures shaped to indicate other signals, a movable member having signals thereon and which is movable to place one or the other of its signals into and out of registration with said first mentioned aperture, a pointer having an aperture and which is arranged in front of said stationary member, means for moving said pointer to bring its aperture into registration with one of said additional apertures in said stationary member when said movable member is moved to display a signal through said first aperture, and means for passing light through a signal and said first aperture when in registration and also through the aperture in said pointer and the corresponding aperture with which it registers.

HARVEY L. SHOTWELL.